United States Patent [19]
Baciu

[11] 3,986,362
[45] Oct. 19, 1976

[54] GEOTHERMAL POWER PLANT WITH INTERMEDIATE SUPERHEATING AND SIMULTANEOUS GENERATION OF THERMAL AND ELECTRICAL ENERGY

[76] Inventor: Petru Baciu, Two Lincoln Square Ap. 20 E, New York, N.Y. 10023

[22] Filed: June 13, 1975

[21] Appl. No.: 586,662

[52] U.S. Cl. .................. 60/641; 60/659; 60/679; 165/45
[51] Int. Cl.² .......................... F03G 7/00
[58] Field of Search .............. 60/641, 659, 679; 165/45

[56] References Cited
UNITED STATES PATENTS

| | | | |
|---|---|---|---|
| 2,919,551 | 1/1960 | Campbell | 60/679 |
| 2,933,885 | 4/1960 | Benedek et al. | 60/659 |
| 2,968,916 | 1/1961 | Taylor et al. | 60/659 X |
| 3,908,381 | 9/1975 | Barber et al. | 60/641 |

*Primary Examiner*—Allen M. Ostrager

[57] ABSTRACT

A geothermal power device including typically a volcanic plug basalt rock geothermal heat exchange unit and a source of a high temperature thermal energy source connected to a gas generator vessel and passing through and through interior space of the generator vessel through isolated flow high pressure conduits surrounded by liquid sodium in communication with a separate high pressure conduit passing through the vessel having ammonia flowing therethrough in isolation from the sodium, and the ammonia carrying conduit being connected to feed a high pressure turbine, effluent from the high pressure turbine in a gaseous state being fed to an intermediate superheater with relatively high pressure coils extending through superheater interior space also containing liquid sodium and also having a high pressure conduit passing therethrough connected to the geothermal energy source, superheated ammonia from the intermediate superheater being fed to a low pressure turbine followed by a condenser and a liquid pump returning liquid ammonia to the ammonia high pressure conduit of the gas generator, the outlet of the geothermal heat source conduit of the intermediate superheater being connected to a heat exchanger for extraction of residual heat, and thereafter the heat exchanger-cooled geothermal source liquid being returned to the geothermal energy source.

11 Claims, 6 Drawing Figures

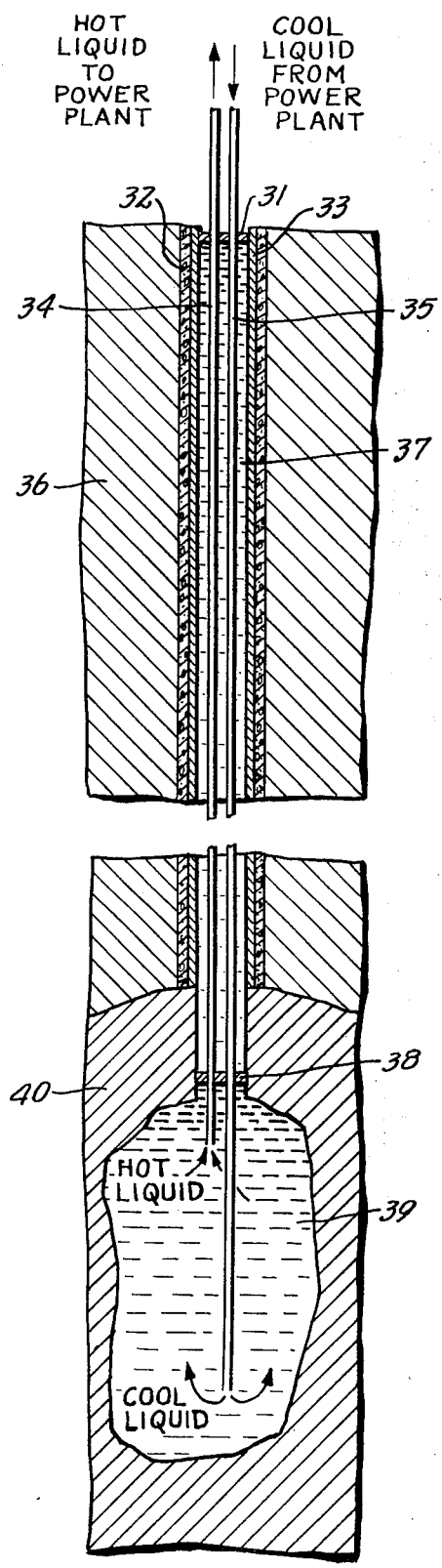
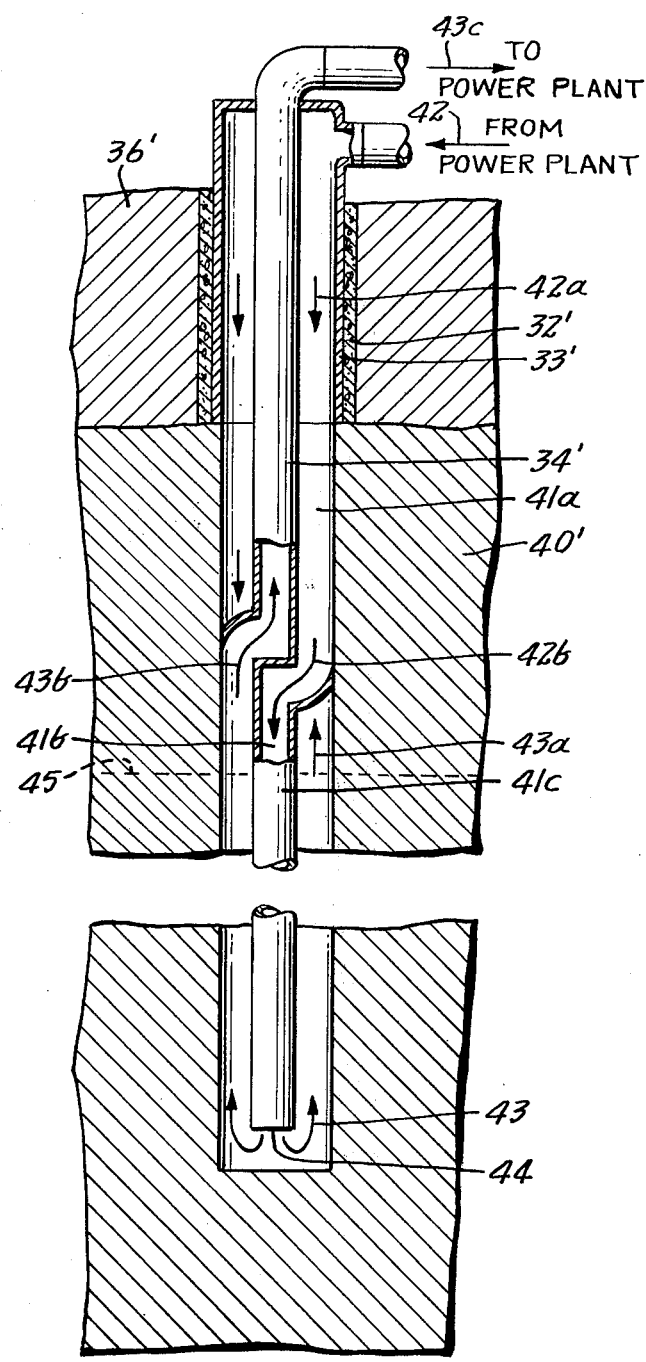

GEOTHERMAL POWER PLANT WITH INTERMEDIATE SUPERHEATING AND SIMULTANEOUS GENERATION OF THERMAL AND ELECTRICAL ENERGY

This invention relates to a novel geothermal power device and process utilizable specifically with high temperature geothermal energy.

BACKGROUND TO THE INVENTION

Heretofore the field of geothermal technology and power devices associated therewith for the conversion of thermal energy from geothermal sources into utilizable power, have been confronted with major problems of particularly low efficiency and utilization of available energy. Utilization of the high levels of thermal energy of geothermal sources characteristically associated with volcanic plugs and/or with geothermal faults, near the surface of the earth providing for extremely high temperatures close to the surface of the earth and normally associated with basalt rock or other magmatic formations, and not characteristic of a majority of geothermal formations and energy sources from conventional technology has heretofore attempted to capture thermal energy therefrom, the more conventional sources providing thermal energy of a much lower temperature.

The very high density of basalt and magmatic rock, associated with typically volcanic plugs and earth faults, provide a temperature gradient and thermal energy source not readily adaptable to the heretofore conventional power devices utilized with geothermal installations, the heretofore conventional installations being characterized by a low level and inefficient conversion and utilization of available thermal energy to practical usable mechanical power thereafter converted to electrical power by the driving of a generator.

SUMMARY OF THE INVENTION

Accordingly, objects of the present invention are to overcome one or more difficulties and problems and disadvantages of geothermal power installations of the types referred to above, as compared to conventional and known types heretofore not readily adaptable to high level thermal geothermal energy sources to which the present invention is directed.

Another object is to obtain a novel installation and technological process of securing geothermal power from geothermal sources of especially high temperature levels, resulting in improved efficiency and a more complete extraction of thermal energy from a geothermal energy source of the type referred to above.

Another object is to obtain a multi-cycle geothermal power device and process thereof, providing for supercritical temperature and pressure operating conditions, together with an accessory heat exchange unit and process for extracting residual thermal energy prior to return of spent liquid to the geothermal heat source.

Another object is to obtain a novel geothermal well combination with and as a part of a power device and process of this invention.

Another object, more particularly, is to obtain more complete extraction of thermal energy of elevated temperatures associated with volcanic and fault formations of basalt and/or magmatic rock formations, and improved efficiency of extraction and utilization of thermal energy derived from such sources.

Other objects become apparent from the preceding and following disclosure.

One or more objects are obtained by the invention as defined herein.

Broadly the invention may be defined as each of a power device and of a process associated therewith, the process characteristically including a passing of a heat exchange liquid medium to a geothermal source of predetermined elevated temperatures, passing liquid state heat exchange medium from the geothermal heat energy source into a gas generator having a high pressure conduit extending therethrough in heat exchange relationship carrying in heat exchange contact-isolation from the geothermal heat exchange medium, a supercritical -operating coolant preferably ammonia, fed to the gas generator in the high pressure conduit in a liquid state and converted to a supercritical gaseous state of supercritical temperature and pressure and fed to a high pressure turbine the effluent of which high pressure turbine, the effluent in a gaseous state, at relatively high pressure conditions, is fed to an intermediate superheater through high-pressure coils extending through interior space of the superheater having liquid sodium, preferably, in the interior space heated by the heat exchange media passed by another high pressure conduit extending also through the space interior of the superheater in isolated flow but heat exchange relationship therewith, and the ammonia during the passing through the intermediate superheater being increased again temperature of a higher magnitude and fed to a low pressure turbine in which the temperature and pressure are reduced to low conditions, the effluent from the low pressure turbine being fed through a condenser and thereafter through a pump in a return cycle to the gas generator for the reheating to the gaseous supercritical state.

In a preferred embodiment of the invention, also the gas generator includes a sealed vessel typically, having liquid sodium therein as an intermediate transfer medium for transfer of thermal energy from the geothermally heated preferably water in the liquid state or phase, passing through the high pressure conduit thereof extending through the liquid sodium, and heat from the liquid sodium being transferred through high pressure conduit structure to the preferably ammonia.

It is to be understood that in substitution for liquid sodium other metals and conventional heat exchange mediums may be utilized, but are less preferred, as compared to the sodium, provided that the other heat exchange mediums have sufficient inherent properties of heat exchange as to be practical, in order to be consistent with the present invention to provide for a high level of and rate of thermal energy transfer from the geothermally heated water within its high pressure conduit and the liquid ammonia within its high pressure conduit extending through the liquid sodium of the gas generator.

Similarly, although ammonia is the preferred supercritically operating heat exchange media as discussed above, it is within the scope of the invention to utilize other exchange medias susceptible of operation at supercritical temperature and pressure at comparable operating parameters of the thermal energy of the geothermal high temperature source to which the present invention is directed.

The invention may be better understood by making reference to the following Figures.

THE FIGURES

FIG. 2 illustrates in side cross-sectional view a geothermal thermal energy well extending with its casings and conduits thereof downwardly through sedimentary rock into basalt rock and making use of a naturally occurring cavern formed therein, this being a geothermal thermal energy source of the typical type to which the power device of the present invention is specifically directed.

FIG. 3 illustrates an alternate embodiment as compared to that of FIG. 2, the FIG. 3 embodiment illustrating in side cross-sectional view in vertical view thereof, an installation of a preferred embodiment, illustrating the down-flow of liquid water around an upward flow conduit through which the water is channeled upwardly, with the exception of the upper outer flow channel being the central conduit starting at an intermediate point in downward traveling, such that downwardly channeled liquid when passing upwardly is in contact with surrounding enviromental rock, thereafter being channeled upwardly centrally in heat-exchange relationship with the down-pipe and being channeled to the gas generator of the present invention.

Figure 4:
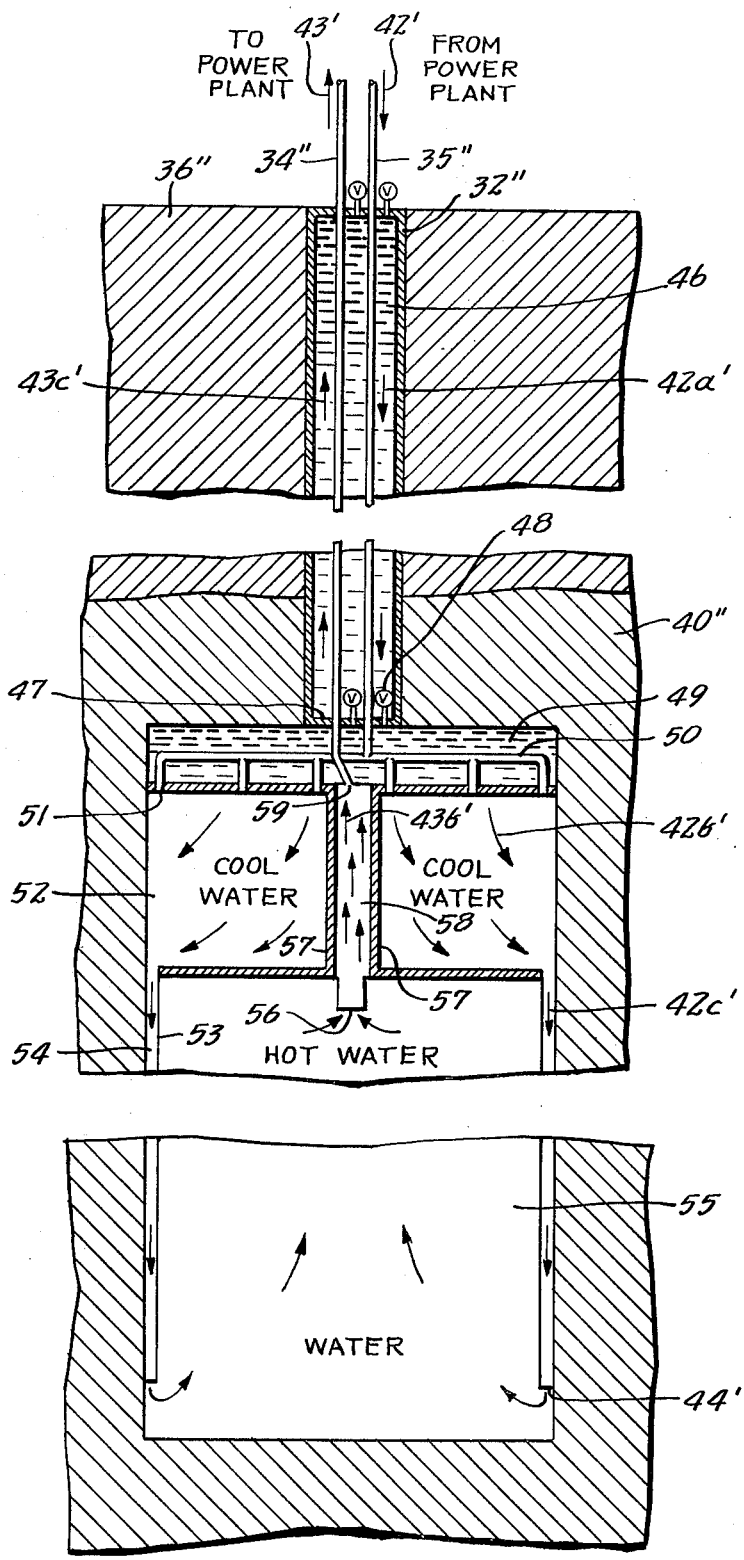

FIG. 4 illustrates an in-part view in side cross-sectional view of an alternate embodiment to that of FIGS. 2 and 3, this embodiment of FIG. 4 differing principally in the fact that the downflow liquid flows downwardly through the intermediate chambers from a plurality of inlets, downwardly from the intermediate chambers into the lower chamber. From the lower chamber the fluid flows by convection upwardly eventually into the central up-flow well leading through the upper chamber, for transport of the water to the gas or steam generator of this invention. In this particular embodiment, the upper chamber serves as a static heat-insulation space filled preferably with liquid such as water or high-molecular weight organic matter.

Figure 5:
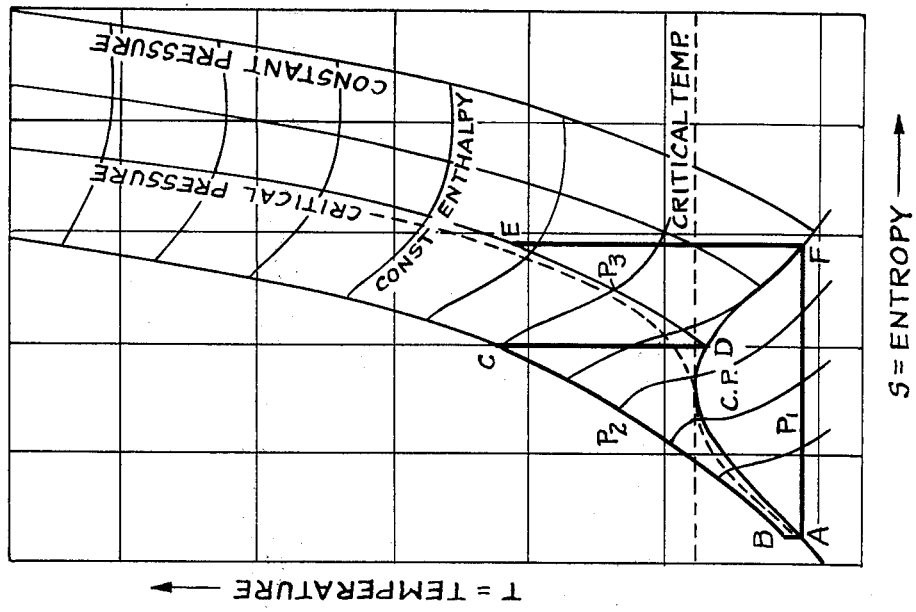

FIG. 5 is a diagram of temperature-entropy for the fluid typically ammonia, as adapted to the present inventive geothermal power device and process thereof.

Figure 6:
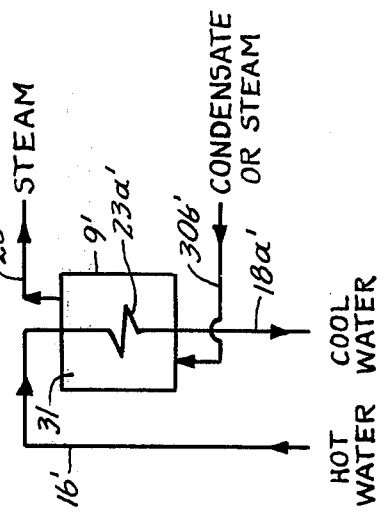
Figure 1:
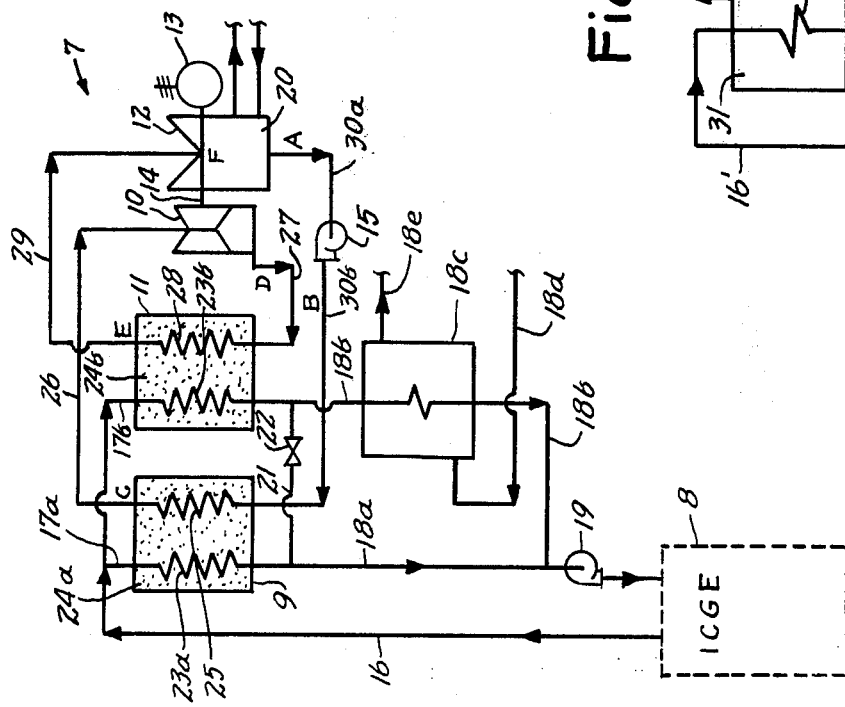
FIG. 1 illustrates diagrammatically a diagram of a preferred embodiment of the present inventive goethermal high-level thermal energy power device.

FIG. 6 illustrates diagrammatically an in-part view of an alternate embodiment for the gas generator of the present invention, as compared to that of the embodiment of FIG. 1.

DETAILED DESCRIPTION OF THE INVENTION

FIG. 1 illustrates diagrammatically a geothermal system and energy power device thereof in a preferred embodiment of the invention, broadly referred to as 7, of which a geothermal thermal energy source (I.C.G.E. — installation for capturing of geothermal energy) feeds thermal energy to a gas-steam generator 9 which in turn provides supercritical pressure and temperature to ammonia channeled to high pressure turbine 10, from which the effluent thereof at relatively high pressure gaseous ammonia state is directed to intermediate superheater 11 where elevated supercritical temperature are restored to the ammonia which is thereupon directed to low pressure turbine 12, the turbines 10 and 12 commonly driving generator 13 for the production of electricity, by common drive shaft 14, from turbine 12 ammonia is directed to condenser 20, from where effluent liquid ammonia is pumped by pump 15 back to the gas-steam generator 9. Geothermally heated liquid heat exchange medium such as typically water is channeled by conduit from pump 19 to the geothermal thermal energy source to provide hot water by conduit 16 and parallel serially located conduits 17a and 17b respectively to the gas-steam generator 9 and the intermediate superheater 11 respectively; the water is channeled by conduit 18a from the gas-steam generator 9 to pump 19, and from the intermediate superheater 11 by pump 19 to and through heat exchanger 18c which thereby further depletes the effluent of superheater 11 of residual energy taken-away thereby by a medium arriving by inlet conduit 18d and leaving by outlet conduit 18e, cooled liquid water thereafter from the conduit 18b being directed to the pump 19. Condenser 20 cools effluent of the low pressure turbine 12, feeding by conduit 30a the liquid ammonia to the liquid pump 15 thereby pumped through conduit 30b to and through the high-pressure conduit 25 onward through conduit 26 in the supercritical state to the turbine 10 and by the conduit 27 to the intermediate superheater relatively high-pressure coil or conduit 28 and thereafter through the conduit 29 to the low pressure turbine 12. Transfer of thermal energy takes place through the liquid sodium 24a and 24b respectively from the high pressure conduits 23a and 23b respectively fed by conduits 17a and 17b respectively, and transferred to the high-pressure conduits 25 and 28 respectively. By-pass conduit 21 includes pressure valve 22.

The alternate embodiment FIG. 6 substitutes for the gas generator 9 and for intermediate superheater 11 an alternate but less desirable respectively and less-efficient for power plant type of steam generator 9' and intermediate superheater 11 in which there is provided hot water — as pressurized water — through conduit 16' for both situations and the cool water is returned to its thermal energy source by conduit 18a', with the heat exchange medium as water (condensate) for steam generator and steam for intermediate superheater, being fed by conduit 30b' to vessel 9' in heat flow communication with coils 23a', and steam is fed away by outlet conduit 26' to the high pressure turbine 10, respectively to low pressure turbine 12. Otherwise, the embodiment of FIG. 6 substantially corresponds to that of FIG. 1 in other aspects, except for variations as would be within mechanical skill. Although FIG. 6 is an alternate to the FIG. 1 gas generator, the same FIG. 6 construction may be substituted for the intermediate superheater, except that in use as an intermediate superheater the FIG. 6 inlet conduit 30b' corresponds to FIG. 1 conduit 27, and the FIG. 6 outlet conduit 26' corresponds to FIG. 1 outlet conduit 29.

FIG. 5 illustrates the temperature entropy diagram for the states of being of the working ammonia of the FIG. 1 embodiment; accordingly, the pressure at various points on the diagram are identified in the FIG. 1, such as the $P_1$, $P_2$, $P_3$, and the various locations for identification purposes — A, B, C, D, E, and F. The operation of the cycle is as follows. At the condenser the ammonia pressure is $P_1$ and temperature is according to point A of FIG. 5. From the condenser, the ammonia goes to the pump 15 where the liquid ammonia is compressed from pressure $P_1$ to pressure $P_2$ at point B, which is a supercritical pressure. In the gas generator 9, the supercritical pressure fluid ammonia is heated to level C from level B. At the high pressure turbine expands the ammonia from C to D converting the geothermal thermal energy to mechanical work energy driving the shaft, the ammonia leaving the high pressure turbine 10 at pressure $P_3$ at point D, and passing through the next conduit to the intermediate superheater where the ammonia vapors are superheated from point D to point E, at pressure $P_3$. Ammonia vapor leaves the intermediate superheater 11 and passes through conduit 29 to the low pressure turbine 12 where the ammonia vapors are expanded from pressure $P_3$ to pressure $P_1$ from point E to point F, converting the heat and pressure energy into mechanical energy of the rotating shaft commonly driven by the high pressure turbine.

When in FIG. 1 the gas generator 9 and intermediate superheater 11 is replaced by steam generator and steam intermediate superheater described above on FIG. 6. Where in place of ammonia we use water, the temperature-entropy diagram has corresponding features, except that there will not be supercritical pressure or temperature. The diagram of FIG. 5 will be substantially the same, but at subcritical conditions.

The condenser 20 and cooling conduits and cycle thereof may be of any desire and/or conventional type.

The geothermal well installations of FIGS. 2 and 3 correspond to those illustrated in my U.S. Pat. No. 3,875,749 of April 18, 1975, and my U.S. Pat. No. 3,883,177 of May 13, 1975. The enormous geothermal deposits with very high thermal parameters, deposits from volcanic plugs, deposits which constitute practically and inexhaustible thermoenergetic source of energy for mankind, not available from other kinds of geothermal locations except at extreme depths normall impractical and self-defeating, the hard and hot rock of these volcanic plugs, or socalled lava magmatic formation rocks, are found in many instances very close to the earth's surface.

The very high density of this rock allows large thermal flows of energy to pass therethrough, which flow is continuous from the magna to the earth's surface, and thermal heat flows of this variety and magnitude require a different kind of geothermal power plant of the type set forth in this invention, utilizing novel technology of the present invention which obtains highly efficient and complete thermoenergetic cycles.

The technologic process of the geothermal power plant with the intermediate superheating thereof and with the simultaneous production of electrical and heat energy is achieved by the equipment heretofore described, together with the process(es) thereof.

The installation of FIG. 2 is the simplest and most significant, in so far as overall installations that may be applied for purposes of this invention.

In the U.S. Pat. No. 3,875,749, there was illustrated how the volcanic plug during the cooling process of magna or volcanic lava and during the formation of hot and hard rock of basalt are characterized by the formation of large quantities of gas which large quantities of gas often remain as bubbles in the hardening rock or lave thereby forming high-pressure gas caverns therein, surrounded by the hot walls of the magmatic rocks. The hot walls of the interior surface of these caverns present a major contribution and asset to the present invention in the capturing of geothermal energy from the hot and hard rock by the plant and process(es) of the present invention as set forth herein. The FIG. 2 illustrates a central shaft passing through sedimentary rocks 37 downward into magmatic rock 40, in communication with a cavern 39 with sealing plugs 38 and upper sealing plug 31, the well being defined by the concrete casing 32 and inner casing 33, with the down-flow conduit 35 and the up-flow conduit 34 both extending through the respective sealing plugs 31 and 38, there being a liquid within the cavern 39 normally cool at the base of the down-flow conduit identified as cooled liquid, and hot liquid at the inlet of the bottom of the up-flow conduit and identified as hot liquid, and there being insulation fluid 37 within the inner casing 33. It is noted that the lower rock, i.e. the basalt rock, does not require a casing because the rock is itself extremely hard and does not constitute any problem in so far as the wells thereof collapsing. It should be noted that the water passing upwardly through upflow conduit 34 is preferably kept at high pressure, possibly at supercritical pressure. The pressure value is a function of the cavery wall temperature(s) and should be such as to maintain the water in a liquid state preferably at all times. This is because steam is less desirable since the thermal conductivity of steam is much smaller than that of water. The magmatic rock formations are not dissolved by water or ammonia even at high temperatures.

FIGS. 3 and 4 illustrate alternate embodiments for installation where high temperatures and geothermal energies are located but in the absence of caverns of the type referred to in the discussion of FIG. 2.

FIG. 3 installation, accordingly, illustrates the sedimentary earth 36', having an outer casing 32' and an inner casing 33', defining an outer conduit for fluid flow in direction 42, downwardly in direction 42a in the outer casing, which becomes central flow as flow 42b within the central flow conduit 41c at a lower elevation, exiting at the base thereof at opening 44, and flowing upwardly as flow 43 within the outer space in communication with the basalt rock 40' as flow 43a which becomes central flow 43b — serving by heat exchange counter-flow to heat downflowing fluid in the outer upper conduit — at an intermediate and upper inner conduit 34' and outwardly to the power plant as flow 43c. The liquid level normally would be at about level 45, indicated by a phantom line. This type installation would be particularly desirable where basalt or equivalent rock formation(s) of high geothermal energy levels are located in the absence of caverns.

FIG. 4 illustrates a heat exchange installation basically involving the same type of process(es) as that of FIG. 3, except better adapted in some locations as compared to others, including the sedimentary earth 36'', having the casing 32'' extending downwardly therethrough with its upflow conduit 34'' and the downflow conduit 35'' through which fluid flows downwardly as downflow 42' into the downflow pipe from the power plant, continuing as flow 42a' within the conduit 35'', and thereafter continuing within the cavern space as flow 42b' and through the outwardly located space adjacent the basalt 40'' cavern walls as flow 42c' and eventually out of the outlet 44' into the main flow isolated space 55 filled with water as is the upper space of flow 42b', and the hot water being channeled centrally within the conduit walls 56 upwardly through a central conduit formed by walls 57 through space 58 as flow 43' into the inlet 59 of upflow pipe or conduit 34'', upwardly as upward flow 43c' and to the power plant 43'. The downflow conduit for flow 42c' is identified as forming space 54 and the space for flow 42b' is identified as space 52, the flow 42b' rising from outlet 51 of conduits 50 connected for receiving flow from the downflow conduit 35''', and passing through the conduits 50 and having parallel outlets within a cavern filled with typically water or other coolant or heat exchange medium in liquid state, identified as 49. This insulation liquid is sealed by the plug 47, having therein the pressure relief and other type desired valves 48 and also the upper plug similarly having such valves in it, typically for emergency pressure relief, from the space 46.

It should be noted that with regard to the FIG. 1 embodiment, an advantage of the gas generator thereof having the liquid sodium between and in contact with the coils of the primary power cycles, i.e. between the coils 23a and 25 respectively, is that whereas the water within the coils 23a may be at supercritical pressure and the ammonia within the coils 25 may be at supercritical conditions, it is possible to have the liquid sodium at subcritical conditions, possibly at atmospheric pressure or other low pressure. The melting point of the sodium is obtainable at a lower temperature than that of the boiling point of water thereby permitting the sodium to be maintained at a liquid state at temperatures at which the water may be maintained in a critical state. This type of gas generator, utilizing ammonia in the power cycle, permits the use of the ammonia in the intermediate superheating apparatus. The same and additional advantages are obtained by the same or similar type of arrangement for the superheater 11.

As intermediate heat transfer medium in each of the gas generator and the intermediate superheater, instead of sodium there may be utilized alone or in admixture other substances, typically potassium for example, or the like.

Various equipment not shown in detail for the diagrammatic views and embodiments of the invention, may be of any desired and/or conventional types(s) normally associated with geothermal and/or turbine installations.

Among other advantages set forth above, the generation of electrical energy as well as the heat or thermal energy from the heat exchanger following the intermediate superheater, as extracting the residual heat from the geothermally heated medium as typically water, is pollution-free, while maximizing the efficiency and completeness for such a particular type of geothermal installation.

It is within the scope of the present invention to make such other variations and modifications and substitution of equivalents as would be apparent to a person of ordinary skill in this particular field or art.

I claim:
1. A geothermal power plant comprising:
   a. a geothermal souce of thermal energy;
   b. a heat transfer fluid;
   c. a plurality of heat storage elements;
   d. first conduit means for directing said heat transfer fluid from said geothermal source through said plurality of heat storage elements in a parallel flow, and back to said geothermal sources; whereby thermal energy is transferred from said geothermal source to said plurality of heat storage elements;
   e. a second fluid conduit means directing a liquified working fluid into one of said heat storage elements whereby said working fluid absorbs thermal energy therein to be thereby vaporized;
   f. a high pressure turbine;
   g. a third fluid conduit means for directing the vaporized working fluid from said one storage element to the high pressure turbine;
   h. a low pressure turbine;
   i. a fourth fluid conduit means for directing the exhaust from the high pressure turbine through the other of said plurality of heat storage elements and then to said low pressure turbine;
   j. a condenser for liquifying the exhaust from the low pressure turbine, said second fluid conduit means receiving the liquified working fluid from said condenser.

2. A geothermal power plant of claim 1, in which said other of said storage elements comprises a vessel containing liquid-state heat exchange medium and separate fifth and sixth conduit means mounted within and extending through the liquid-state heat exchange medium, the heat exchange medium and fifth and sixth conduit means being in heat exchange relationship such that thermal energy is transfered from said heat-transfer medium within said fifth conduit means to the heat exchange medium and from the heat exchange medium to the sixth conduit means and said heat-transfer medium within said sixth conduit means, said fifth conduit means being connected to said first conduit means and being thereby adapted to receive the heat-transfer fluid in a gaseous state from said geothermal source, and a heat exchange means connected to the fifth conduit means and adapted for heat-transfer of heat residual energy of effluent from said first conduit means, the sixth conduit means being connected for conducting flow between and connected to said fourth fluid conduit means of said exhaust and directing heated exhaust to said low pressure turbine.

3. A geothermal power plant of claim 2, in which said other of said storage elements further includes an enclosing structure enclosing said liquid-state heat exchange medium, said fifth and sixth conduit means being mounted on said enclosing structure extending therethrough for each respectively, flow of said heat transfer fluid within said fifth conduit means being in closed flow isolated relationship to said liquid-state heat exchange medium, and flow of said exhaust within said sixth conduit being in closed flow isolated relationship to each of said fifth conduit and said liquid-state heat exchange medium.

4. A geothermal power plant of claim 3, in which said one of said plurality includes seventh and eighth conduit means and vessel structure mounting the seventh and eighth conduit means and defining an enclosed space with the seventh and eighth conduit means separate from and with flow thereof isolated from one-another and from the closed space, and liquid-state heat exchange medium being within said enclosed space and in communication with each of said seventh and eighth conduit means, the fifth conduit means being adapted to receive said heat-transfer fluid in a liquid state from and connected to said geothermal source and connected to and feeding said vaporized working fluid to said fourth fluid conduit means, and the sixth conduit means being connected to feed liquid effluent to said geothermal source, and said eighth conduit means being connectd to an exchanger outlet to receive said liquid working fluid and to feed said vaporized working fluid to said third conduit means.

5. A geothermal power plant of claim 4, in which said fifth and sixth and seventh and eighth conduit means are structured to withstand predetermined high temperature and pressure conditions.

6. A geothermal power plant of claim 1, in which said plurality of heat storage elements and said first conduit means are each structured to withstand predetermined high temperature and pressure conditions.

7. A geothermal power plant of claim 6, in which said geothermal source includes a geothermal heat-exchanger means for extracting thermal energy from geothermally-heated rock.

8. A geothermal power plant of claim 4, in which said liquid-state heat exchange medium is liquid sodium.

9. A geothermal power plant of claim 7, in which said geothermal heat-exchanger means is mounted within magmatic formation rocks.

10. A geothermal power plant of claim 9, in which said geothermal heat-exchanger means comprises naturally-occurring closed-cavern-defining-rock walls of said magmatic rock formation said magmatic rock formation defining a seated passage in communication with exterior space, and said conduit means being mounted within and extending through said seated passage between exterior space and closed cavern space defined by the naturally-occurring closed-cavern-defining rock walls.

11. A geothermal power plant of claim 9, in which said geothermal heat-exchanger means comprises: a downflow conduit structure defining an outer conduit extending downwardly and therebeneath defining an inner conduit extending downwardly opening into a rock cavern space, and an upflow conduit structure defining an inner conduit extending upwardly within said outer conduit of the downflow conduit structure and defining an outer conduit therebeneath extending downwardly defining space around said inner conduit of said downflow conduit structure such that fluid flowing from said opening by convection flows upwardly through the space around the inner conduit of the downflow conduit and flows upwardly thereafter into and through the upflow conduit structure's inner conduit.

* * * * *